W. AVERY.
LATHE DOG.
APPLICATION FILED JAN. 3, 1914.
1,171,406.
Patented Feb. 15, 1916.
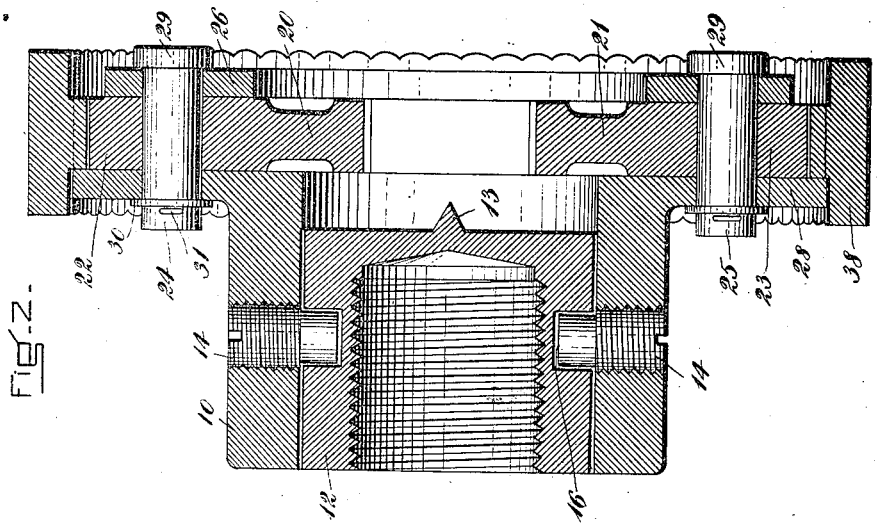
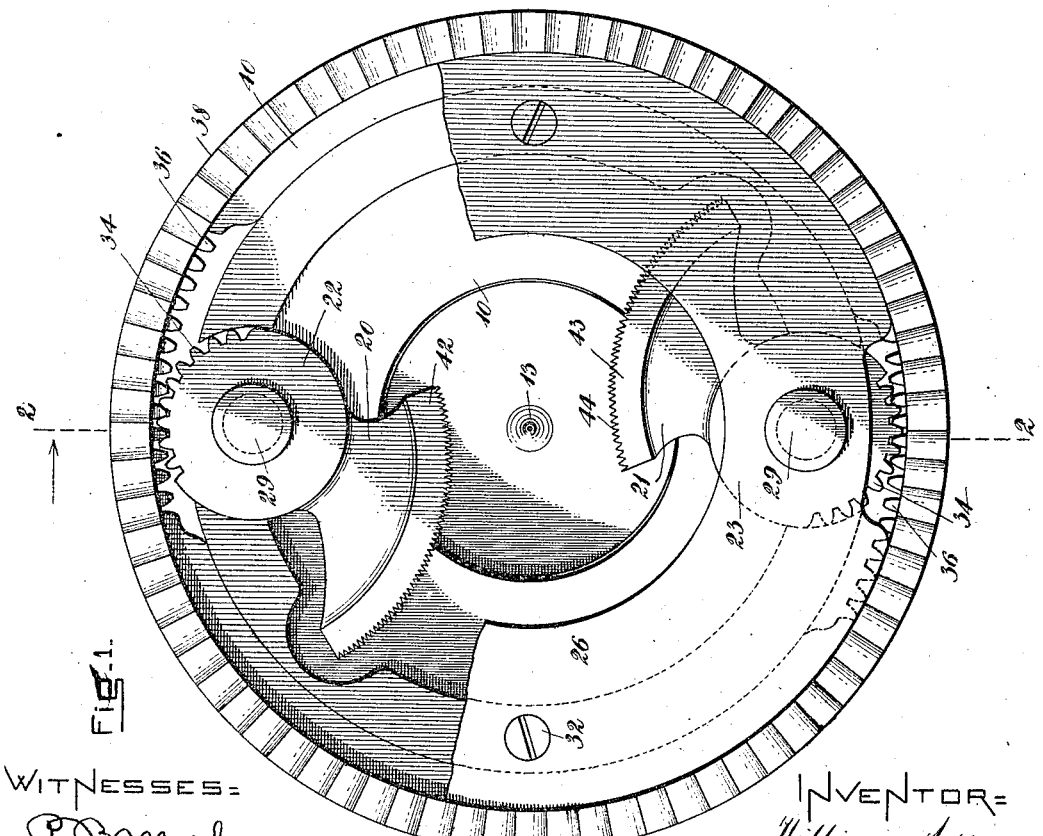

UNITED STATES PATENT OFFICE.

WILLIAM AVERY, OF FOXBORO, MASSACHUSETTS.

LATHE-DOG.

1,171,406.  Specification of Letters Patent.  Patented Feb. 15, 1916.

Application filed January 3, 1914. Serial No. 810,247.

*To all whom it may concern:*

Be it known that I, WILLIAM AVERY, of Foxboro, in the county of Norfolk and State of Massachusetts, have invented certain new and useful Improvements in Lathe-Dogs, of which the following is a specification.

This invention relates to an improvement in lathe dogs.

The object of the invention is to provide a lathe dog which will handle any shape of stock, which can be readily clamped and released while the lathe is in motion, and which will adjust itself to irregularities without bringing side strain on the lathe center.

With the above object in view, the invention consists in the lathe dog hereinafter described and particularly defined in the claim.

The invention will be readily understood from an inspection of the accompanying drawing, in which—

Figure 1 is a front elevation of an illustrative embodiment of the invention, with parts broken away, and Fig. 2 is a vertical section taken on the line 2—2 in Fig. 1.

As illustrated in the drawing, the dog comprises a supporting member in the form of a collar 10, which is adapted to rotatably fit very loosely a stationary member or sleeve 12, the latter being internally threaded to fit the spindle of a lathe, and it may be provided with a center 13. The collar 10 is secured to the sleeve 12 by means of set screws 14, which are adapted to enter holes 16 in said sleeve. These screws 14 do not bottom, neither do they touch the sides of the holes 16. There is a clear space of $\frac{1}{32}$ of an inch all around between sleeve 12 and the collar 10. Acting in these spaces it becomes a floating dog, and automatically adjusts itself to the centers.

A pair of clamping jaws 20, 21 are provided, having cylindrical portions 22, 23, which are pivotally mounted on pins 24, 25, and held by said pins between an annular plate or ring 26 and a flange 28 on the collar 10. The pins 24, 25 are provided with heads 29 on one end, which bear against the outside of the ring 26, and each pin is provided on the other end with a washer 30 and a cotter pin 31. The ring 26 is also secured to the flange 28 by means of screws 32. The cylindrical portions 22, 23 of the jaws are provided with gear teeth 34 over a portion of their peripheral faces, and these teeth mesh with gear teeth 36 on the inner peripheral face of a ring 38. This ring is provided with an inner flange or web 40, which fits between the ring or plate 26 and the flange 28, and the outer faces of the ring 38 are knurled or roughened to enable said ring to be more readily held by the hand of the operator while clamping and releasing a piece of work.

The jaws 20, 21 are provided with arcuate work-engaging faces 42, 43, which are provided with teeth 44, or otherwise roughened to engage the work. These faces are eccentric with respect to the pivotal centers of the jaws, and approach the work or recede therefrom simultaneously when the ring 38 is rotated relatively to the flange 28.

By the construction above set forth it will be observed that a comparatively short movement of the ring 38 will cause a considerable movement of the clamping jaws. The dog will clamp and center any shape of stock, such as round, square, oblong or other polygonal cross-section, and it can be closed upon the work or released therefrom when the lathe is in motion, thus saving time. The dog is also floating as it is freely rotatable about the sleeve 12, and is constructed so that it will adjust itself to irregularities without bringing any lateral or side strain upon the lathe center, which is also a very important feature. It is also adapted for use in holding a piece of material when a taper is to be turned thereon with the tail-stock of the lathe off center. Although only two clamping jaws are shown, it will be understood that any desired number of jaws may be employed.

What I claim is:—

A lathe dog comprising a sleeve constructed for engagement with a lathe spindle and having a pair of opposing openings and a collar loosely mounted on the sleeve provided with opposing pins constructed to loosely engage the openings in the sleeve, the collar further being provided with pivotally mounted clamping jaws and an operating means therefor.

In testimony whereof I have affixed my signature in the presence of two witnesses.

WILLIAM AVERY.

Witnesses:
FRIEND P. CARPENTER,
Mrs. MINA M. PRESTON.